United States Patent [19]

Bederke et al.

[11] Patent Number: 5,686,532
[45] Date of Patent: Nov. 11, 1997

[54] BINDER COMPOSITION, COATING COMPOSITION CONTAINING THIS BINDER, PRODUCTION AND USE THEREOF

[75] Inventors: Klaus Bederke, Sprockhövel; Volker Duecoffré; Carmen Flosbach, both of Wuppertal; Eva Frigge, Bochum; Walter Schubert; Friedrich Herrmann, both of Wuppertal, all of Germany

[73] Assignee: Herberts Gesellschaft mit beschrankter Haftung, Wuppertal, Germany

[21] Appl. No.: 491,145

[22] Filed: Jun. 16, 1995

Related U.S. Application Data

[63] Continuation of Ser. No. 148,682, Nov. 4, 1993, abandoned.

[30] Foreign Application Priority Data

Nov. 7, 1992 [DE] Germany .......................... 42 37 658.0

[51] Int. Cl.$^6$ ........................................... C08L 33/04
[52] U.S. Cl. .................. 525/222; 525/227; 525/400; 525/407; 525/437; 525/438; 525/523
[58] Field of Search ........................ 525/222, 227, 525/407, 400, 437, 438, 523

[56] References Cited

U.S. PATENT DOCUMENTS 4,680,361  7/1987  Kogke et al. ........................ 526/318
4,691,045  9/1987  Fukuchi et al. ...................... 560/185

*Primary Examiner*—E. Rollins Buffalow
*Attorney, Agent, or Firm*—Schweitzer Cornman Gross & Bondell LLP

[57] ABSTRACT

A binder composition, a coating composition containing this binder, a process for its production and use to produce single or multi-layer lacquer coatings, particularly in the automotive sector, are described. The binder composition contains A) 25 to 75 wt. % of the reaction product of one or more carboxy-functionalised poly(meth)acrylic copolymers and/or one or more carboxy-functionalised polyesters, each with an acid value of 15 to 200 mg KOH/g, with one or more lactones, B) 25 to 75 wt. % of one or more epoxy-functionalised crosslinking agents with at least two epoxy functional groups per molecule, with a number average molecular weight (Mn) of 200 to 10000 g/mol, C) 0 to 60 wt. % of one or more polyols with at least two hydroxyl functional groups per molecule, $D_1$) 0 to 20 wt. % of one or more melamine resins, $D_2$) 0 to 40 wt. % of one or more capped polyisocyanates, wherein the sum of the weight percentages of components A), B), C), $D_1$) and $D_2$) is 100 wt. %, together with E) 0 to 10 wt. % of one or more catalysts to catalyse the reaction of the carboxyl and epoxy groups, related to the sum of the weights of components A) to $D_2$).

15 Claims, No Drawings

BINDER COMPOSITION, COATING COMPOSITION CONTAINING THIS BINDER, PRODUCTION AND USE THEREOF

This is a continuing application of U.S. Ser. No. 08/148,682 filed on Nov. 4, 1993 now abandoned.

BACKGROUND OF THE INVENTION

The invention relates to binder compositions suitable for the production of coating compositions which are baked at elevated temperature and, in particular, are suitable for the production of multi-layer lacquer coatings, for example in the automotive sector.

A baking lacquer is known from DE-A-30 22 996 in which polymers containing carboxyl groups, such as for example acrylates based on acrylic or methacrylic acid, and acrylates containing glycidyl groups are mixed into a curable composition.

WO 84/00771 describes a multi-component system in which four types of binder are mixed together and then applied. The components are an acrylate containing hydroxyl groups, acid anhydride, wherein at least 50% are alkyl hexahydrophthalic acid anhydrides, epoxy resin and melamine resin. The systems have a high solids content.

DE-A-23 33 384 describes a binder based on acrylated polyesters, which are obtained by polymerisation of an acrylate containing hydroxyl groups into a polyester or alkyd resin containing hydroxyl groups. Crosslinking may then be simultaneously performed with melamine resins and epoxy resins.

DE-A-38 00 389 describes the modification of copolymers having hydroxyl groups with lactones, in particular ε-caprolactone.

Known coating compositions in part give rise to films with elevated hardness and good weathering resistance. However, they do not fulfil the constantly increasing requirements for elevated acid and solvent resistance.

SUMMARY OF THE PRESENT INVENTION

The object of the invention is to provide a binder system which may be processed into coating compositions which may be baked at elevated temperatures to form coatings with good hardness, good weathering resistance and elevated elasticity which are additionally resistant to acids and solvents. The coating compositions should have good application properties (reduced tendency to sag), even in thick layers.

DETAILED DESCRIPTION OF THE INVENTION

It has been found that this object may be achieved by a binder composition provided by the invention and containing:
A) 25 to 75 wt. % of the reaction product of one or more carboxy-functionalised polyacrylic copolymers and/or one or more carboxy-functionalised polyesters, each with an acid value of 15 to 200 mg KOH/g, with one or more lactones,
B) 25 to 75 wt. % of one or more epoxy-functionalised crosslinking agents with at least two epoxy functional groups per molecule, with a number average molecular weight (Mn) of 200 to 10000 g/mol,
C) 0 to 60 wt. % of one or more polyols with at least two hydroxyl functional groups per molecule,
$D_1$) 0 to 20 wt. % of one or more melamine resins,
$D_2$) 0 to 40 wt. % of one or more capped polyisocyanates, wherein the sum of the weight percentages of components A), B), C), $D_1$) and $D_2$) is 100 wt. %, together with
E) 0 to 10 wt. % of one or more catalysts to catalyse the reaction of the carboxyl and epoxy groups, related to the sum of the weights of components A) to $D_2$).

According to a preferred embodiment of the invention, the carboxy-functionalised poly(meth)acrylic copolymers, which may be reacted with lactone according to component A), have a number average molecular weight (Mn) of 500 to 10000 g/mol. The carboxy-functionalised polyesters which may correspondingly be used preferably have a calculated molecular weight of 500 to 2000 g/mol. The acid value of these starting materials is some 15 to 200 mg KOH/g, preferably 30 to 140 mg KOH/g and particularly preferably 60 to 120 mg KOH/g.

The invention also relates to coating compositions which may be produced from the binder compositions according to the invention. These coating compositions may be aqueous and/or contain solvent and may optionally contain pigments, extenders and/or auxiliary substances and additives customary in lacquers; they may also be formulated as powder coatings without solvents and water.

In component A) of the binder or coating compositions according to the invention, the carboxyl groups are modified by reaction with lactones. The carboxyl groups are "chain extended" by the addition of lactones. Ring-opening of the lactone to be added brings about esterification of the carboxyl groups originally located on the poly(meth)acrylate skeleton and/or polyester skeleton, wherein however the lactone carboxyl groups are liberated so giving rise to reaction products which have exposed carboxyl groups on the short side chains corresponding to the lactone.

In the production of the poly(meth)acrylic copolymers or polyesters containing carboxyl groups used in the preparation of component A), the carboxyl groups may be introduced directly by the use of structural units containing carboxyl groups, for example during polymer formation, such as (meth)acrylic copolymers. Examples of suitable monomers containing carboxyl groups which may be used for this purpose are unsaturated carboxylic acids, such as for example acrylic, methacrylic, itaconic, crotonic, isocrotonic, aconitic, maleic and fumaric acid, semi-esters of maleic and fumaric acid together with β-carboxyethyl acrylate and adducts of acrylic acid and/or methacrylic acid hydroxyalkyl esters with carboxylic acid anhydrides, such as for example phthalic acid mono-2-methacryloyloxyethyl ester.

In the present specification and the patent claims, the term (meth)acrylic is used. This term means acrylic and/or methacrylic.

It is, however, also possible in the production of the (meth)acrylic copolymers or polyesters containing carboxyl groups initially to form a polymer containing hydroxyl and optionally carboxyl groups and with an OH value of 15 to 200 mg KOH/g and to introduce the carboxyl groups in their entirety or in part in a second stage by reacting the polymers containing hydroxyl and optionally carboxyl groups with carboxylic acid anhydrides.

Carboxylic acid anhydrides suitable for addition onto the polymers containing hydroxyl groups are anhydrides of aliphatic, cycloaliphatic and aromatic saturated and/or unsaturated di- and polycarboxylic acids, such as for example phthalic, tetrahydrophthalic, hexahydrophthalic, succinic, maleic, itaconic, glutaric, trimellitic and pyromellitic anhydrides, together with the halogenated or alkylated derivatives thereof.

Phthalic, tetrahydro- and hexahydrophthalic anhydrides, together with 5-methylhexahydrophthalic anhydride are preferably used.

Examples of hydroxyalkyl esters of α,β-unsaturated carboxylic acids with primary hydroxyl groups suitable for the production of hydroxyl-functional poly(meth)acrylates are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. 2-hydroxypropyl acrylate, 2-hydroxybutyl acrylate, 3-hydroxybutyl acrylate and the corresponding methacrylates are cited as examples of hydroxyalkyl esters with a secondary hydroxyl group which may be used.

Advantageously, the hydroxy-functionalised component may at least in part be a reaction product prepared from one mol of hydroxyethyl acrylate and/or hydroxyethylmethacrylate and an average of 2 mol of ε-caprolactone.

A reaction product of acrylic acid and/or methacrylic acid with the glycidyl ester of a carborylic acid with a tertiary α-carbon atom may also at least in part be used as the hydroxy-functionalised component. Glycidyl esters of highly branched monocarboxylic acids are obtainable under the trade name "Cardura". The reaction of the acrylic acid or methacrylic acid with the glycidyl ester of a carboxylic acid with a tertiary α-carbon may proceed before, during or after the polymerisation reaction.

In addition to the above-stated monomers, further ethylenically unsaturated monomers may also be used in the production of the (meth)acrylic copolymers. Selection of the further ethylenically unsaturated monomers is not critical. All that must be ensured is that incorporation of these monomers does not lead to undesirable copolymer properties.

Further suitable ethylenically unsaturated components are, in particular, alkyl esters of acrylic and methacrylic acid, such as for example methyl (meth)acrylate, ethyl (meth) acrylate, propyl (meth)acrylate, butyl (meth)acrylate, isopropyl (meth)acrylate, isobutyl (meth)acrylate, pentyl (meth)acrylate, hexyl (meth)acrylate, cyclohexyl (meth) acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate and octadecenyl (meth)acrylate. It is also possible to use silane-modified monomers, such as for example gamma-methacryloxypropyltrimethoxysilane or gamma-methacryloxypropyl-tris(2-methoxyethoxy)-silane.

Instead of the above-stated alkyl esters of acrylic and methacrylic acid or together with these alkyl esters, further ethylenically unsaturated monomers may be used to produce (meth)acrylic copolymers, wherein selection of these monomers is largely guided by the desired properties of the coating composition in terms of hardness, elasticity, compatibility and polarity.

Examples of further suitable ethylenically unsaturated monomers are the alkyl esters of maleic, fumaric, tetrahydrophthalic, crotonic, isocrotonic, vinylacetic and itaconic acid, such as for example the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters.

Furthermore, small proportions of monomers with at least two polymerisable, olefinically unsaturated double bonds may be used. Preferably, the proportion of these monomers is less than 5% related to the total weight of monomers.

Examples of such compounds are hexanediol diacrylate, hexanediol dimethacrylate, ethylene glycol diacrylate, ethylene glycol dimethacrylate, butanediol diacrylate, butanediol dimethacrylate, hexamethylenebismethacrylamide, trimethylolpropane triacrylate, trimethylolpropane trimethacrylate and similar compounds.

A further suitable component is a monovinyl aromatic compound. Preferably, this compound contains 8 to 9 carbon atoms per molecule. Examples of such suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and in particular styrene are preferably used.

The polymers containing carboxyl groups used in the production of component A) are copolymers and/or polyesters containing carboxyl groups. The polyesters containing carboxyl groups may be formed according to customary methods (c.f. for example B. Vollmert, Grundriβ der makromolekularen Chemie [fundmentals of macromolecular chemistry], E. Vollmert-Verlag Karlsruhe 1982, vol. II, p. 5 et seq.) from aliphatic and/or cycloaliphatic di-, tri- or polyhydric alcohols, optionally together with monohydric alcohols and from aliphatic, aromatic and/or cycloaliphatic carboxylic acids together with polybasic polycarborylic acids. Examples of suitable alcohols are ethylene glycol, 1,2-propanediol, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, glycerol, trimethylolethane, trimethylolpropane, pentaerythritol, etherification products of diols and polyols, for example di- and triethylene glycol, polyethylene glycol, neopentyl glycol ester of hydroxypivalic acid.

Examples of suitable carboxylic acids are adipic, azelaic, 1,3- and 1,4-cyclohexane dicarboxylic acid, tetrahydrophthalic, hexahydrophthalic, endomethyl-tetrahydrophthalic acid, isophthalic acid, o-phthalic acid, terephthalic acid or the anhydrides and esterifiable derivatives thereof.

The calculated molecular weights of the polyesters are between 500 and 2000 g/mol.

The carboxy-functional poly(meth)acrylic copolymers and polyesters usable in the production of component A) are "chain extended" with a lactone. The lactones (cyclic esters) attach themselves to carboxyl groups, wherein the ring is opened producing a new terminal carboxyl group. An example of a particularly preferred lactone is epsilon-caprolactone.

Examples of other lactones are gamma-butyrolactone and lactones such as beta-propiolactone, delta-valerolactone, delta-butyrolactone, zeta-enantholactone, eta-caprylolactone. Such lactones may be substituted; examples are 6-methyl-epsilon-caprolactone, 3-methyl-epsilon-caprolactone, 5-methyl-epsilon-caprolactone, 5-phenol-epsilon-caprolactone, 4-methyl-delta-valerolactone, 3,5-dimethyl-epsilon-caprolactone and mixtures thereof.

The reaction with the lactone may, for example, proceed directly after synthesis of the resin, i.e. after synthesis of the poly(meth)acrylic polymer and/or polyester. The reaction proceeds, for example, at elevated temperature, for example at temperatures of up to 100° C. The reaction may, for example, be performed with stirring, for example, for up to 10 hours.

The binder composition or coating compositions according to the invention contain as component B) one or more epoxy-functionalised compounds with at least two epoxy functional groups per molecule, with a number average molecular weight (Mn) of 200 to 10000 g/mol.

Examples of such components B) are customary di- or polyepoxides, for example polyglycidyl ethers based on diethylene glycol, dipropylene glycol, polypropylene glycol with a number average molecular weight Mn of up to 2000, triglycidyl ethers of glycerol and/or di- or polyphenols such as bisphenol A.

Further examples of di- or polyepoxides are those based on di- or polyglycidyl esters. Examples of these are the reaction products of 1-hydroxy-2,3-epoxypropane with phthalic or terephthalic acid to form phthalic or terephthalic acid bis(2,3-epoxypropyl ester) or a diglycidyl ether of bisphenol A with trimellitic anhydride to form polyesters with a number average molecular weight Mn of 500–2000.

Further examples which may also be used are glycidyl-functionalised (meth)acrylic copolymers. Examples of these are copolymers of glycidyl (meth)acrylate or 2,3-epoxycyclopentyl acrylate. Comonomers which may be selected are (meth)acrylic acid esters, such as for example methyl, ethyl, butyl, isobutyl, ethylhexyl, cyclohexyl and/or lauryl (meth)acrylate, hydroxy-functionalised (meth)acrylic acid esters such as for example hydroxyethyl and/or hydroxypropyl ester, together with styrene, vinyltoluene and/or α-methylstyrene. The number average molecular weight (Mn) may be between 1000–10000, preferably 2000–5000. Further copolymerisable glycidyl monomers are, for example, (meth)allylglycidyl ether or 3,4-epoxy-1-vinylcyclohexane. The copolymers are produced by free-radical solution polymerisation, which is known to the person skilled in the art and requires no further explanation.

It is also possible to at least partially precondense binder components A) and B) in an additional reaction stage. This may for example be achieved by heating components A and B together. The desired degree of condensation may for example be determined by the reduction in the acid value. It is, for example, possible to heat the reaction mixture while stirring it to temperatures of 80° to 120° C. and to continue stirring until the acid value of the mixture has fallen by for example 2 to 5 mg KOH/g. Self-evidently, it is also possible to reduce the acid value further, but care should be taken to ensure that the viscosity of the mixture does not rise as far as gelation. The storage stability of the compositions may be further increased by precondensing components A) and B).

It is also possible to at least partially precondense binder components B) and C). To this end, it is for example possible to introduce some or all of the hydroxy-functional polyol of component C) into a vessel, optionally together with one or more organic solvents, and to react some or all of the monomers required for production of the epoxy-functional component B) in it. For example, the hydroxy-functional polyols C), optionally with solvent, may be introduced into a vessel and heated, for example to temperatures of the order of 140° C. The monomers required for production of the epoxy-functional component B), optionally together with initiators, may be apportioned, for example over a period of up to 5 hours. The polyol component C), as defined in greater detail below, used in this procedure is preferably a polyester polyol, in particular with a number average molecular weight Mn of 500 to 2000, preferably with an acid value below 3 mg KOH/g and preferably with an OH value of 15 to 200 mg KOH/g. Such a precondensate of B) and C) may have advantages compared with a mixture of B) and C), such as for example better compatibility and more homogeneous mixing.

The binder composition or coating compositions according to the invention may contain one or more polyols with at least two hydroxyl functional groups per molecule as component C). These polyols may, for example, be selected from a) polyols from the group, of unbranched or branched alkane di- and polyols with 2 to 12 carbon atoms or, b) poly(meth)acrylates or poly(meth)acrylamides containing hydroxyl groups based on (meth)acrylic acid hydroxyalkyl esters with 2 to 12 carbon atoms in the alkyl component, optionally copolymerised with α,β-unsaturated monomers, with a number average molecular weight Mn of 1000 to 10000 or c) poly(meth)acrylates containing hydroxyl groups based on (meth)acrylic acid hydroxyalkyl esters with 2 to 12 carbon atoms in the alkyl component and optionally copolymerisable α,β-unsaturated monomers, which are modified with cyclic esters of hydroxycarboxylic acids with 4 to 6 carbon atoms, with a number average molecular weight Mn of 1000 to 10000 or d) polyester polyols or polyether polyols with a number average molecular weight Mn of 500 to 2000.

Examples of alkane di- and polyols of group a) are those with unbranched and branched chains with 2 to 12 carbon atoms. They contain at least two hydroxyl functional groups, but preferably at least three.

Examples of these are propanediol, butanediol, hexanediol, glycerol, trimethylolpropane and pentaerythritol.

Examples of poly(meth)acrylates b) containing hydroxyl groups based on (meth)acrylic acid hydroxyalkyl esters with 2 to 12 carbon atoms in the alkyl component are hydroxyalkyl esters of acrylic or methacrylic acid with alcohols having at least two hydroxyl groups, such as 1,4-butanediol mono(meth)acrylate, 1,6-hexanediol mono(meth)acrylate or 1,2,3-propanetriol mono(meth)acrylate. Examples of poly(meth)acrylamides b) containing hydroxyl groups based on (meth)acrylic acid hydroxyalkyl amides are amides of acrylic or methacrylic acid with hydroxyalkyl amines or di(hydroxyalkyl) amines having 2 to 12 carbon atoms in the alkyl component, which may have one or more hydroxyl groups, such as acrylic acid hydroxyethyl amide.

The component b) poly(meth)acrylates containing hydroxyl groups may be homo- or copolymers. They have a number average molecular weight (Mn) of 1000 to 10000, preferably 3000 to 6000 g/mol. Copolymerisable monomers for production of the copolymers are α,β-unsaturated monomers, free-radical polymerisable monomers from the group of esters of α,β-unsaturated carboxylic acids, such as acrylic or methacrylic acid, wherein examples of the alcohol component are methyl, ethyl, propyl alcohols and their isomers and higher homologues. Further examples are diesters of maleic or fumaric acid, wherein the alcohol component is the same as stated above. Further examples are aromatic vinyl compounds such as styrene, α-methylstyrene and vinyltoluene. Further examples are vinyl esters of short-chain carboxylic acid such as vinyl acetate, vinyl propionate and vinyl butyrate.

The poly(meth)acrylates containing hydroxyl groups of the above-defined component c) may be modified poly(meth)acrylate homo- and copolymers, as described under b), the hydroxyl groups of which may be entirely or partially reacted with cyclic esters, such as for example of hydroxycarboxylic acid with 4 to 6 carbon atoms, such as gamma-butyrolactone or epsilon-caprolactone. The modified component c) poly(meth)acrylates obtained have a number average molecular weight Mn of 1000 to 10000.

Examples of component d) polyester polyols and polyether polyols are those with a number average molecular weight Mn of 500 to 2000 g/mol. Specific examples are reaction products of di- or tricarboxylic acids such as adipic acid or trimellitic acid, with polyols, wherein the polyols are present in excess. Further examples are reaction products of di- or triols, such as propanediol, butanediol or glycerol, with ethylene oxide or propylene oxide.

The binder composition or coating compositions according to the invention may optionally contain as component $D_1$) one or more crosslinking agents, in particular melamine resins. Examples of these are non-water-soluble butanol or isobutanol etherified melamines such as for example the commercial product Setamin® US 138 or Maprenal® MF 610; co-etherified melamines which are etherified with both butanol and methanol, such as for example Cymel® 254, together with hexamethyloxymethyl melamine (HMM melamines) such as for example Cymel® 301 or Clanel® 303, wherein an acid catalyst such as for example p-toluenesulphonic acid may optionally be added to the latter for crosslinking.

Further examples of amine resin crosslinking agents are customary hydrophilic and thus water-soluble or water-compatible melamine resins, such as for example methyl etherified melamines such as for example Cymel® 325, Cymel® 327, Cymel® 350 and Cymel® 370, Maprenal®MF 927.

The coating compositions according to the invention may contain one or more capped polyisocyanates as crosslinking agents (component $D_2$). Examples of the polyisocyanates on which the capped polyisocyanates are based are cycloaliphatic, aliphatic or aromatic polyisocyanates such as tetramethylene diisocyanate, hexamethylene diisocyanate, 2,2,4-trimethylene diisocyanate, 1,12-dodecane diisocyanate, 1,3- and 1,4-cyclohexane diisocyanate, 1-isocyanato-3,3,5-trimethyl-5-isocyanatomethylcyclohexane (=isophorone diisocyanate, IPDI), perhydro-2,4'- and/or -4,4'-diphenylmethane diisocyanate, 1,3- and 1,4-phenylene diisocyanate, 2,4- and 2,6-tolylene diisocyanate, diphenylmethane-2,4' and/or -4,4' diisocyanate, 3,2'- and/or 3,4-diisocyanato-4-methyl-diphenylmethane, naphthylene-1,5 diisocyanate, triphenylmethane-4,4',4"-triisocyanate, tetramethylxylylene diisocyanate or mixtures of these compounds.

Apart from these simple isocyanates, those isocyanates containing heteroatoms in the residue linking the isocyanate groups are also suitable. Examples of these are polyisocyanates having carbodiimide groups, allophanate groups, isocyanurate groups, urethane groups, acylated urea groups and biuret groups.

Particularly well suited to the invention are known polyisocyanates which are mainly used in lacquer production, for example modification products of the above-stated simple polyisocyanates containing biuret, isocyanurate or urethane groups, in particular tris-(6-isocyanatohexyl)-biuret or low molecular weight polyisocyanates with urethane groups, as may be obtained by the reaction of an excess of IPDI with simple polyhydric alcohols of the molecular weight range 62–300, particularly with trimethylolpropane. Naturally, any desired mixtures of the stated polyisocyanates may also be used for the production of the products according to the invention.

Further suitable polyisocyanates are the known prepolymers having terminal isocyanate groups, as are in particular accessible by the reaction of the above-stated simple polyisocyanates, principally diisocyanates, with substoichiometric quantities of organic compounds with at least two groups capable of reacting with isocyanate groups. The compounds used to this end are preferably such compounds having at least two amino groups and/or hydroxyl groups with a number average molecular weight of 300 to 10000, preferably 400 to 6000.

In these known prepolymers, the ratio of isocyanate groups to hydrogen atoms reactive with NCO is 1.05 to 10:1, preferably 1.1 to 3:1, wherein the hydrogen atoms preferably originate from hydroxyl groups.

The type and quantity ratios of the starting materials used in the production of the NCO prepolymers are furthermore preferably selected such that the NCO prepolymers have a) an average NCO functionality of 2 to 4, preferably from 2 to 3 and b) a number average molecular weight of 500–10000, preferably from 800–4000.

The isocyanate groups of the polyisocyanates are completely capped. Customary capping agents may be used for capping, as are for example used in the lacquers sector. Examples of capping agents which may be used are dimethyl malonate, diethyl malonate, ethyl acetoacetate, epsilon-caprolactam, acetanilide, acetylacetone, acetone oxime, 1,2-propanediol and/or butanone oxime, wherein the last stated capping agent is preferred.

The polyisocyanates may for example be capped by heating one or more polyisocyanates with the capping agent. For example, one of more polyisocyanates may be introduced into a vessel and heated while being stirred to, for example approximately 80° C. and the capping agent apportioned (for example over some 10 min). Stirring is continued until the NCO value is less than 0.1%. It is also possible to cap one or more polyisocyanates with a mixture of two or more capping agents.

The advantage of using two or more different polyisocyanates and/or two or more different capping agents is that crosslinking may consequently proceed over a wide temperature range.

The binder composition according to the invention and thus the coating compositions according to the invention contain one or more catalysts (component E). These are in particular catalysts soluble in organic solvents or in water or miscible with organic materials. Examples of suitable catalysts which are soluble in organic solvents or in water or miscible with organic materials are phosphonium salts, such as for example ethyltriphenylphosphonium acetate, phosphate, chloride, bromide, iodide, butyltriphenylphosphonium acetate, phosphate, chloride, bromide, iodide, benzyltriphenylphosphonium acetate, phosphate, chloride, bromide, iodide and quaternary ammonium salts, such as for example alkylbenzyldimethylammonium chloride, benzyltrimethylammonium chloride, methyltrioctylammonium chloride, tetraethylammonium bromide, N-dodecylpyridinium chloride and tetraethylammonium iodide. The preferred catalysts which are soluble in organic solvents or miscible with organic materials are ethyltriphenylphosphonium acetate, phosphate, chloride, bromide, butyltriphenylphosphonium acetate, phosphate, chloride, bromide, benzyltriphenylphosphonium acetate, phosphate, chloride, bromide, and methyltrioctylammonium chloride. Ethyltriphenylphosphonium phosphate may for example be obtained from ethyl triphenylphosphonium acetate by reaction with phosphoric acid.

A further example for a catalyst is p-toluene sulfonic acid. It is also possible to react the glycidyl functionalized resin with p-toluene sulfonic acid which can, e.g. be carried out at elevated temperatures, e.g. up to 80° C. In this case, the p-toluene sulfonic acid is added and the oxirane ring is opened. When the obtained lacquer is cured at elevated temperatures, the p-toluene sulfonic acid is recovered by splitting and catalyses the cross-linking of a COOH/epoxide.

The catalyst soluble in organic solvents and/or water or miscible with organic materials may be contained in a quantity of approximately 0 to approximately 10.0 wt. %, preferably from 0.3 to 2.0 wt. %, related to the sum of the weights of components A) to $D_2$).

It is also possible to link an amine catalyst with the COOH-functionalised (meth)acrylate resin mixture. This conveniently proceeds by copolymerising tert.-amino(meth) acrylic monomers during synthesis of the COOH-functionalised (meth)acrylate resin.

Examples of such monomers are dimethylaminoethyl (meth)acrylate, diethylaminopropyl (meth)acrylate and dimethylaminopropyl (meth)acrylate. The proportion of these (meth)acrylates is 0.5 to 10 wt. %, preferably 1 to 5 wt. %, related to the total solids content of the COOH-functionalised (meth)acrylate resin.

On preparation of the binder compositions or coating compositions according to the invention, the quantity ratios are preferably selected such that between the component A) resin containing carboxyl groups and the epoxy component B) there is a molar ratio of the reactive groups of 1:3 to 3:1 and that there preferably prevails between the sum of the weights of components A) to C) to the weight of the component $D_1$) melamine resin a ratio of 65:35 wt. % to 98:2 wt. % or to the weight of the capped isocyanates $D_2$) a ratio of 60:40 to 95:5 wt. %. The binder compositions according to the invention may be used for the production of coating compositions. They may contain solvents, such as are for example customary in the production of coating compositions, for example lacquers. The solvents may also be those as used in the production of the individual components.

Examples of such solvents are organic solvents, such as aliphatic and aromatic hydrocarbons, for example toluene, xylene, mixtures of aliphatic and/or aromatic hydrocarbons, esters, ethers and alcohols. These are customary lacquer solvents. Aqueous solutions may also be prepared in the production of coating compositions from the binders according to the invention. Suitable emulsifiers, as are customary in the lacquers sector, may optionally be used to this end.

The binder compositions according to the invention, together with the coating compositions according to the invention may also be in aqueous form, wherein they contain no organic solvents or have only a small proportion of organic solvents. To produce aqueous compositions, it is for example possible largely to eliminate organic solvents from the component A) containing carboxyl groups, for example by distillation, then to neutralise some of the carboxyl groups, for example with bases such triethylamine or dimethylethanolamine and then emulsifying in water, which is optionally heated. The other resins may then optionally be emulsified into this emulsified resin. This is, for example, achieved by heating the emulsified resin to 60°–80° C. and, over a period of 5 to 120 minutes, stirring in the hydroxy- and/or epoxy-functional resins which have also been heated to 60°–80° C.

It is also possible to mix the COOH-functionalised resin and the epoxy resin, from both of which the solvents have largely been eliminated, and to emulsify them into a water/emulsifier mixture by means of a rotor/stator apparatus. It is also possible to emulsify the components separately and to mix the emulsions.

Pigments, extenders and/or auxiliary substances and additives customary in lacquers may be added during production of the coating compositions according to the invention. These are additives customary in lacquers as are familiar in the lacquers sector.

The quantities are within the customary range familiar to the person skilled in the art.

Example of such additives are pigments, for example coloured pigments such as titanium dioxide or carbon black and effect pigments such as metal flake pigments and/or pearlescent pigments. The binder compositions formulated according to the invention are also suitable for coating compositions containing such effect pigments. These coating compositions preferably contain effect pigments together with coloured pigments or coloured pigments together with extenders. Further examples of additives are customary lacquer extenders such as for example talcum and silicates, together with auxiliary substances and additives such as plasticisers, light stabilisers, stabilisers and flow-control agents such as-silicone oils. These are also used in customary quantities familiar to the person skilled in the art.

Coating compositions produced from binders according to the invention are suitable for coatings which adhere to many substrates, such as for example wood, textiles, plastics, glass, ceramics and in particular metal.

The coating compositions according to the invention may be applied using known processes, such as spraying, dipping, rolling or knife application. To this end, the topcoat lacquer is applied to the substrate, which has optionally already been provided with other lacquer layers. After a flash-off phase, the applied coating composition is cured by heating. Baking temperatures are between 20° to 180° C., preferably 60° to 150° C. The thickness of the baked film is approximately 15 to 60 µm. Baking produces a crosslinked, hard, glossy and acid-resistant lacquer coating.

A preferred embodiment is application of the coating composition according to the invention as a clear lacquer coating onto a base lacquer, preferably an aqueous base lacquer. It is possible here to work wet-on-wet, or the base lacquer may be previously dried by heating. This produces particularly good adhesion between the two layers.

Using the coating compositions according to the invention formulated without pigments as clear lacquers, it is possible to overcoat base lacquers which may contain customary topcoat pigments; they preferably contain effect pigments such as for example metallic pigments. The base lacquer is preferably based on polyester, polyurethane or acrylate resins. These binders may optionally be crosslinked with crosslinking agents, for example derivatives of melamine or isocyanate.

Below are listed several further examples of base lacquers which may preferably be coated with lacquers according to the invention which have been formulated without pigments as clear lacquers or with pigments as topcoat lacquers.

Aqueous base lacquers based on 5 to 95% of an aqueous epoxy-functionalised emulsion polymer and 95 to 5 wt. % of an anionic polyurethane dispersion with an acid value of 5 to 10 mg KOH/g. Suitable grinding resins for such pigments and additives used in aqueous base lacquers are in particular poly(meth)acrylate resin (for example in a quantity of up to 20 wt. %). Examples of such aqueous base lacquers are described in DE-A-36 28 124.

Base lacquers based on polyesters with a glass transition temperature of >30° C., melamine resins (for example partially butylated melamine resins), polyurea plasticisers (for example based on an adduct of butyl urethane and formaldehyde) and a polyethylene (85 wt. %)/vinyl acetate (15 wt. %) copolymer as wax dispersion. Such base lacquers may contain customary additives such as cellulose acetobutyrate (for example with differing molecular weight ranges). Examples of such base lacquers are described in EP-A 187 379.

An example of solvent-based base lacquers which are particularly suitable for repair purposes contains physically drying binders based on thermoplastic polyester and/or acrylic resin mixed with cellulose ethers or cellulose esters and/or polyvinyl acetates. Also contained are self-curing acrylic resin binders containing colour pigments and having hydrogen atoms which react with isocyanate, additionally together with mixtures of cellulose ethers and/or cellulose esters and/or cellulose semi-esters dissolved in solvents. Such lacquers are for example described in DE-OS 29 24 632.

All the preceding base lacquer formulations may contain customary lacquer additives, together with customary extenders and coloured pigments together with metal pigments such as aluminium or stainless steel bronzes and other effect pigments.

Powder coatings are also examples of base lacquers which may be coated with clear lacquers based on coating compositions according to the invention, as are for example described in "Products Finishing", April 1976, pages 54–56.

It is possible to heat the lacquer, e.g. to 60° to 100° C. and to apply it while hot. Ths reduces the viscosity of the lacquer and it can be applied with a high solids content.

It is also possible to add super-critical carbon dioxide as a solvent to the lacquer and to apply it in accordance with the so-called Unicarb process, which, e.g. is described in EP-A 0 321 607 and in EP-A 0 388 927.

The coating compositions according to the invention may also be formulated as base lacquers and as fillers. They are then particularly suitable for the production of multi-layer lacquer coatings, for example in the automotive sector. When formulating the coating compositions as base lacquers or fillers, customary additives, as for example described above for base lacquers, may be added.

In comparison with customary base lacquers, the base lacquers according to the invention in particular provide coatings with improved moisture-temperature resistance.

The base lacquers according to the invention may be overcoated wet-on-wet with customary clear lacquers, optionally after brief initial drying. They are preferably overcoated with clear lacquers based on coating compositions according to the invention.

The coating compositions according to the invention are in particular suitable for topcoat lacquers or clear and base lacquers, which are preferably used in the automotive sector, but also in other areas. Use of the coating composition according to the invention in multi-layer lacquer coating is particularly suitable for mass production automotive lacquer coating, but it may also be used for other purposes, such as for example household appliances or in the furniture industry in order to obtain coatings with particularly high acid stability.

In the following examples, parts (pt.) and % relate to weight.

EXAMPLE 1

Production of a carboxy-functional resin 1375 parts of xylene are introduced into a 4 liter, three-necked flask fitted with stirrer, thermometer, dropping funnel and reflux condenser and are heated while being stirred to refluxing temperature (approx. 140° C.). Over 5 hours, a mixture of

| 264 pt. | acrylic acid |
| 292 pt. | styrene |
| 294 pt. | butyl acrylate |
| 470 pt. | butyl methacrylate and |
| 55 pt. | tert.-butyl perbenzoate | is added dropwise and post-polymerised for 4 hours.

The carboxy-functional resin has a solids content of 49.5% (1 h, 150° C.), an acid value of 151 mg KOH/g and a viscosity of >20000 mPas (25° C.).

EXAMPLE 2

Chain extension with epsilon-caprolactone (component A)

On completion of post-polymerisation of the product from example 1, 334 parts of epsilon-caprolactone are added dropwise within 30 minutes to 2750 parts of the carboxy-functional resin from example 1. The reaction is performed at 140° C. until the theoretical solids content is achieved.

The chain extended carboxy-functional resin has a solids content of 54.5% (1 h, 150° C.), an acid value of 127 mg KOH/g and a viscosity of 4730 mPas (25° C.).

For use in an aqueous clear lacquer (example 6), the carboxy-functional resin is evaporated under a vacuum to a solids content of 86.3%.

EXAMPLE 3

Production of an epoxy-functional resin (component B)

1250 parts of xylene are introduced into a 4 liter, three-necked flask fitted with stirrer, thermometer, dropping funnel and reflux condenser and are heated while being stirred to refluxing temperature (approx. 140° C.). Over 5 hours, a mixture of

| 750 pt. | glycidyl methacrylate |
| 155 pt. | styrene |
| 195 pt. | butyl acrylate |
| 100 pt. | butyl methacrylate and |
| 50 pt. | tert.-butyl perbenzoate | is added dropwise and post-polymerised for 6 hours.

The epoxy-functional resin has a solids content of 49.4% (1 h, 150° C.)

For use in an aqueous clear lacquer (example 6), the epoxy-functional resin is evaporated under a vacuum to a solids content of 82.7%.

EXAMPLE 4

Production of coating compositions

In the following examples and in the comparative test, the catalyst (component E) used is a) a 33% solution of butyltriphenylphosphonium chloride in ethanol and b) a 33% solution of ethyltriphenylphosphonium chloride in completely deionised water.

The melamine resin (component D) used is a customary commercial methylated melamine resin (Clanel 325/80®).

EXAMPLE 5

Production of a clear lacquer composition

The following formula is used to produce a clear lacquer composition

| 56.3 pt. | chain extended carboxy-functional resin from example 2 |
| 31.5 pt. | epoxy-functional resin from example 3 |
| 3.9 pt. | catalyst solution from example 4a |
| 2.3 pt. | butyl diglycol acetate |
| 6.0 pt. | melamine resin |

The solids content of the clear lacquer composition is 52.3%.

Comparative test

A clear lacquer composition is produced as in example 5, wherein however a carboxy-functional resin is used which has not been chain extended with epsilon-caprolactone. The following formula was used:

| 53.9 pt. | carboxy-functional resin from example 1 |
| 34.0 pt. | epoxy-functional resin from example 3 |
| 3.9 pt. | catalyst solution from example 4a |
| 2.2 pt. | butyl diglycol acetate |
| 6.0 pt. | melamine resin |

The solids content of the clear lacquer composition is 49.5%.

The clear lacquers from example 5 and the comparative test are applied with a coating knife to a dry film thickness of approximately 40 µm on an iron sheet or a glass plate and, after flashing-off at room temperature for 10 minutes, are baked for 20 minutes at 140° C.

|  | Clear lacquer from example 5 | Clear lacquer from comparative test |
|---|---|---|
| König pendulum hardness | 133s | 138s |
| MEK rub | >100 | <10 |
| H$_2$SO$_4$ (10%, 65° C.) | 20 min | 12 min |
| Appearance | glossy | matt |

MEK rub means an abrasion test using a swab impregnated with methyl ethyl ketone.

The clear lacquer coating obtained with the example 5 clear lacquer according to the invention has substantially improved solvent resistance and acid resistance in comparison with the comparative test; appearance is also improved.

EXAMPLE 6

Production of an aqueous clear lacquer a) Production of an aqueous emulsion:

128 parts of a 10% solution of an emulsifier based on a polyoxypropylenepolyoxyethylene sorbitan diester and 0.1 parts of a customary commercial defoamer (BYK 022) are introduced into a 1 liter flask at 60° C. The mixture is stirred with a stirrer which rotates at a speed of approximately 8500 rpm. Within 3 minutes, a mixture of 174 parts of carboxy-functional resin from example 2 (solids content: 86.3%), 92 parts of epoxy-functional resin from example 3 (solids content: 82.7%) and 31 parts of melamine resin together with 23 parts of completely deionised water are added at 60° C.

The milky white emulsion obtained has a solids content of 56.1%.

b) Aqueous clear lacquer composition

| 307.6 pt. | emulsion from example 6a |
| 14.0 pt. | catalyst solution from example 4b |
| 59.0 pt. | completely deionised water |

The aqueous clear lacquer has a solids content of 45.3%. The lacquer is applied with a spray gun (1.3 mm jet) to a dry film thickness of approximately 40 μm onto bare iron sheet or onto iron sheet coated with a multi-layer lacquer coating with an electrocoated primer, filler and aqueous base lacquer and, after 20 minutes' flashing-off (10 min room temperature, 10 min 80° C), baked for 20 minutes at 140° C. Properties of the baked films:

on iron sheet:
Pendulum hardness: 111s
in structure:
Pendulum hardness: 73s
MEK rub: >100
H$_2$SO$_4$ (10%, 65° C.): >20 min
Crosshatching test: grade 0–1 (very good to good)

We claim:

1. Binder composition suitable for coating compositions which binder composition contains A) 25 to 75wt. % of the reaction product of one or more lactones with (1) the carboxyl group of one or more carboxy-functionalized poly(meth)acrylic copolymers and/or (2) the reaction product of the carboxyl group of one or more carboxy-functionalized polyesters, each with an acid value of 15 to 200 mg KOH/g, B) 25 to 75wt. % of one or more epoxy-functionalized crosslinking agents with at least two epoxy functional groups per molecule, with a number average molecular weight (Mn) of 200 to 1000 g/mol, c) 0 to 60 wt. % of one or more polyols with at least two hydroxyl functional groups per molecule, D$_1$) 0 to 20 wt. % of one or more melamine resins, D$_2$) 0 to 40 wt. % of one or more capped polyisocyanates, wherein the sum of the weight percentages of components A), B), C), and D$_1$) and D$_2$) is 100 wt. %, together with E) 0 to 10 wt. % of one or more catalysts to catalyze the reaction of the carboxyl and epoxy groups, related to the sum of the weights of components A) to D$_2$).

2. Binder composition according to claim 1, in which the carboxy-functionalised poly(meth)acrylic copolymers have a number average molecular weight (Mn) of 500 to 1000 g/mol and the carboxy-functionalized polyesters a calculated number average molecular weight of 500 to 2000 g/mol.

3. Binder composition according to claim 1 or in which the resin components A) and B) are at least partially pre-condensed.

4. Binder composition according to claim 1, characterized in that component B was entirely or partially produced in the presence of at least part of component C.

5. Binder composition according to claim 4, characterised in that component C is a hydroxy-functional polyester.

6. Coating composition containing the binder composition according to claim 1.

7. Coating composition according to claim 6 in the form of a lacquer, which lacquer contains a solvent.

8. Coating composition according to claim 7 with a solvent content of 2 to 60 wt. % based on total composition.

9. Coating composition according to claim 6 which contains water and optionally one or more organic solvents.

10. Coating composition according to claim 6 in the form of a powder coating.

11. Coating composition according to claim 6 in the form of a clear lacquer with ho pigments nor extenders.

12. Coating composition according to claim 6 in the form of a topcoat or base lacquer containing pigments, extenders and/or auxiliary substances and additives used in lacquer compositions.

13. Process for the production of a coating composition according to one claim 6, characterized in that a binder composition according to one of claims 1 to 5 is dissolved or dispersed in one or more organic solvents and/or water, optionally after partial neutralisation of the carboxyl groups present and, before or after dissolving or dispersing, is mixed with auxiliary substances and additives, pigments and/or extenders used in lacquers.

14. The binder composition of claim 1 wherein the carboxy-functionalized poly(meth)acrylic copolymer or carboxy-functionalized polyester is formed by reacting a corresponding polymer containing hydroxyl with a carboxylic acid anhydride prior to reaction with said lactone.

15. The binder composition of claim 14 wherein said carboxylic acid anhydride is selected from the group consisting of anhydrides of aliphatic, cyclodiphatic and aromatic di- and polycarboxylic acid.

* * * * *

UNITED STATES PATENT AND TRADEMARK OFFICE
CERTIFICATE OF CORRECTION

PATENT NO.  : 5,686,532
DATED       : November 11, 1997
INVENTOR(S) : Klaus Bederke; Volker Duecoffre; Carmen Flosbach; Walter Schubert; Friedrich Herrmann; Eva Frigge It is certified that error appears in the above-identified patent and that said Letters Patent is hereby corrected as shown below:

| | | |
|---|---|---|
| Col. 3,  | Line 15, | change "carborylic" to --carboxylic--. |
| Col. 12, | Line 10, | change "iuethacrylate" to --methacrylate--; |
|          | Line 32, | change "Clanel" to --Cymel--. |
| Col. 14, | Line 4,  | change "1000" to --10,000--; |
|          | Line 18, | change "1000" to --10,000--; |
|          | Line 60, | change "cyclodiphatic" to --cycloaliphatic--. |

Signed and Sealed this

Twenty-ninth Day of September, 1998

Attest:

BRUCE LEHMAN

Attesting Officer

Commissioner of Patents and Trademarks